(No Model.) 2 Sheets—Sheet 1.
J. N. PARKER.
CULTIVATOR.
No. 442,909. Patented Dec. 16, 1890.
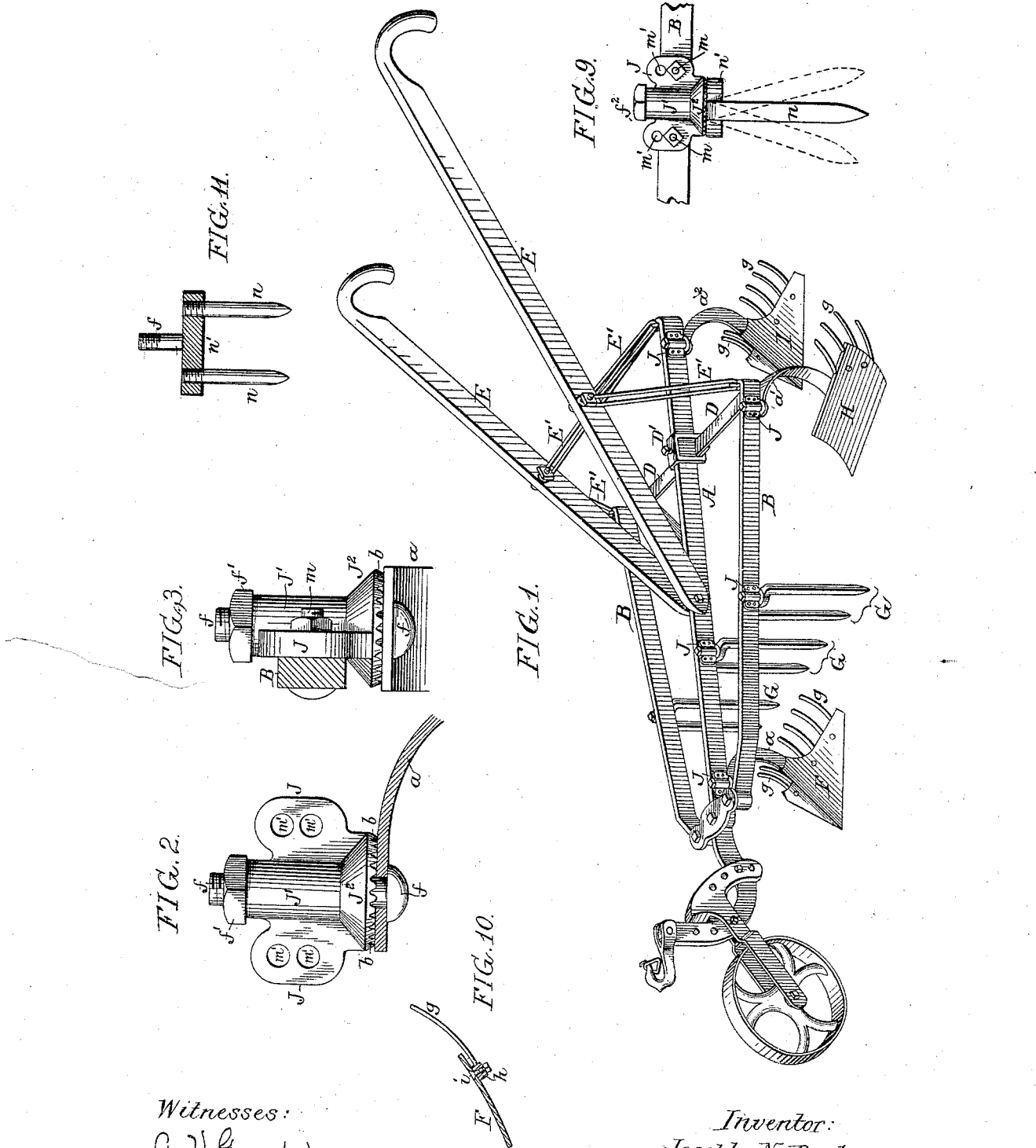
Witnesses:
A. V. Groupe
Murray C. Boyer
Inventor:
Joseph N. Parker
by his Attorneys
Howson & Howson (No Model.) 2 Sheets—Sheet 2.
J. N. PARKER.
CULTIVATOR.
No. 442,909. Patented Dec. 16, 1890.
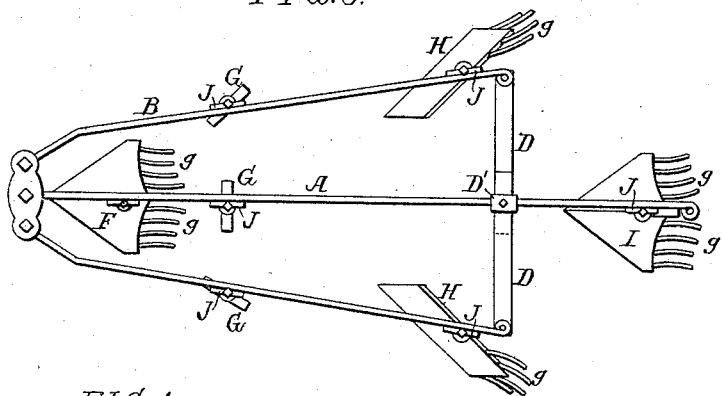
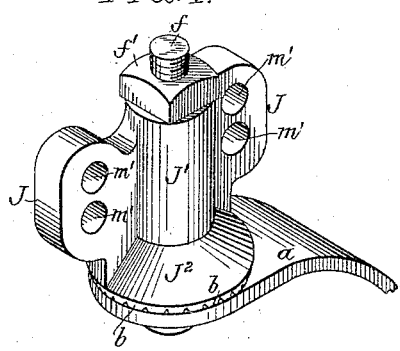
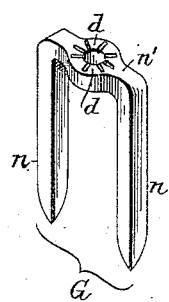
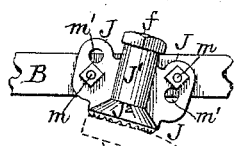
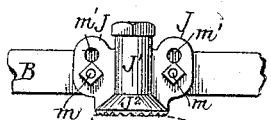
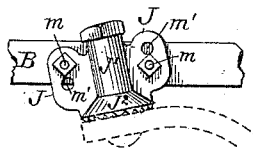
Witnesses:
A. V. Groupe
Murray C. Boyer
Inventor:
Joseph N. Parker
by his Attorneys
Howson & Howson

UNITED STATES PATENT OFFICE.

JOSEPH N. PARKER, OF VINELAND, NEW JERSEY.

CULTIVATOR.

SPECIFICATION forming part of Letters Patent No. 442,909, dated December 16, 1890.

Application filed May 26, 1890. Serial No. 353,252. (No model.)

*To all whom it may concern:*

Be it known that I, JOSEPH N. PARKER, a citizen of the United States, and a resident of Vineland, Cumberland county, New Jersey, have invented certain Improvements in Horse-Hoes, Cultivators, &c., of which the following is a specification.

The object of my invention is to construct an agricultural implement in the nature of an ordinary cultivator, but which is capable of a large and varied number of uses, special features of the implement being the holder or hanger for the blade, tooth, or hook, and a special form of scratch-tooth.

In the accompanying drawings, Figure 1 is a perspective view of an agricultural implement constructed in accordance with my invention. Fig. 2 is a side view, partly in section, of the holder or hanger for the hook, tooth, or other blade of the machine. Fig. 3 is an end view of the same with the bar of the frame in section. Fig. 4 is a perspective view of the holder and of part of one of the standards or teeth of the machine. Fig. 4½ is a perspective view of one of the scratch-teeth. Fig. 5 is a plan view of part of the machine without the handles or handle-braces and illustrating the different methods of using the special form of scratch-tooth or harrow forming one of the features of the invention. Figs. 6, 7, 8, and 9 are diagrams illustrating adjustments of the holder. Fig. 10 is a view illustrating the method of securing the projecting bars or fingers to the hooks, sweeps, or other blades of the machine; and Fig. 11 is a view illustrating a modification of part of my invention.

In Fig. 1 the frame of the machine is shown as consisting of a central bar A and opposite side bars B, the latter being flared at their rear ends and connected by bracing-bars D and clamp D' to the central bar, so as to be expanded and contracted laterally, the handles E being independent of each other and being hung to the central bar and connected by braces E' to the rear ends of the central and side bars in a manner similar to that set forth and claimed in my Letters Patent No. 422,620, dated March 4, 1890. It should be understood, however, that this form of frame is adopted merely for purposes of illustration, as my present invention may be carried out in connection with many different forms of frames.

As shown in the drawings, the central bar A of the machine has near the front end a beam or standard $a$, carrying a vine-lifting blade or sweep F, each of the bars of the frame, some distance from the front end, carrying a double-pointed scratch-tooth G, while the rear end of each side frame has a standard $a'$, carrying a hoe-blade H, and the rear end of the central bar has a standard $a^2$, carrying a sweep I. Each of these various devices is connected or secured to the frame by the same form of holder or support, which consists of a plate J, having on one side a projecting hub or boss J', flared at its lower end $J^2$, and having on the under side of this flared portion projecting ribs or teeth $b$, for engagement with corresponding ribs or teeth $d$, formed upon the body, beam, shank, or standard (hereinafter for convenience denominated the "stock") of the tooth or blade supported by said holder, a bolt $f$, passing through said stock and through the hub or boss J' of the holder and being provided with a nut $f'$, bearing upon the top of said hub, so that by simply loosening this nut the blade, tooth, or plate can be turned with or upon the bolt as a pivot to any desired position in respect to the bar or beam of the cultivator, and on again tightening the nut can be secured in this position of adjustment, any accidental displacing of the tooth or blade being prevented owing to the engagement of the ribs or teeth $b$ and $d$. By this means the range of adjustment covers a full circle. Hence any desired adjustment of hook, tooth, or blade can be effected, depending upon the work to be performed.

The plate J has a flat side for bearing against the beam or bar of the frame, to either side of which or to a beam at either side of the frame it can therefore be adjusted, the plate being secured to the beam by front and rear bolts $m$, and said plate having preferably two openings $m'$ both at front and rear for the reception of this bolt, thus permitting adjustment of the holder to different angles in respect to the vertical, so as to throw the blade, plate, or hook carried thereby to front or rear and up and down, as desired, and as shown in Figs. 6 to 9.

As the holder can be used upon either side of either bar of the frame and with either end front, it follows that said holders are perfectly interchangeable, there being no rights and lefts or other special constructions necessitating a special location of the holders upon the frame.

The function of the forward sweep or plow F is to skim lightly along the surface of the ground between the rows of vines or plants which are being cultivated and to lift and separate the trailing and interlaced portions of said vines or plants so as to prevent them from interfering with the proper action of the cultivating devices following in the rear of said sweep, and in order to aid the sweep in performing this separating and lifting duty the solid blade constituting the body of the sweep is provided on each side with a series of upwardly and rearwardly projecting fingers $g$, which serve to lift and support the vines, shoots, or runners, while at the same time they cause the sifting of the earth from the same. The bars or fingers $g$ are secured to a bar $h$, which is secured to the back of the blade F by one or more bolts $i$, passing through the blade and bar and having its head flush with the surface of the blade, as shown in Fig. 10, the fingers $g$ being threaded and adapted to threaded openings in the bar or secured thereto in any other available manner.

In the rear of the blade or sweep F is the series of double-pointed scratch or harrow teeth G, each of which consists, preferably, of a bar or plate, round or square in cross-section and bent so as to form depending portions $n$, and a connecting stock or bridge portion $n'$, the latter having about midway the opening for the reception of the bolt, whereby it is hung to the holder J, and surrounding this bolt-hole the ribs or teeth $d$ for engagement with those of said holder, these ribs or teeth as well as the bolt-hole being readily formed on the bar of which the tooth is made or upon the stocks of any of the other tools by an ordinary drop-forging operation. The stock of the tooth may, if desired, be independent of the depending portions, the latter being secured to the opposite ends of the stock by screwing, riveting, or other means, and the stock may have a central bolt formed integral therewith in place of the bolt-hole shown, especially if said stock is made in the form of a malleable casting, as shown, for instance, in Fig. 11. A double-pointed scratch-tooth pivoted in this way is capable of use in various positions, depending upon the particular character of the work to be performed. Thus it may be set at different angles in respect to the beams or bars of the frame, so as to cause the two fingers $n'\ n'$ to act one in advance of the other, and as close to each other laterally as may be desired, even to the point of almost following one in the wake of the other, or at a farther distance apart, or at their full distance apart, and in the same transverse plane, all of these adjustments being shown in Fig. 5, the action of the six teeth being in any case, however, effected with the use of but three holders. The teeth can also be inclined either forward or backward for harrowing or smoothing, as shown in Fig. 9. The function of these teeth, in a machine constructed as shown in Fig. 1, is to scratch, break up, or pulverize the surface of the ground so as to provide for the more efficient action of the hoe-plates, blades, or teeth H, and central plow or sweep I.

The hoe-blades H serve to cast the broken up or pulverized earth against the row of plants or vines on each side, and the central plow or sweep I acts in like manner to throw the earth from the center of the row out toward each side.

Both of the hoe-blades H and the blades I have rearwardly and upwardly or outwardly projecting fingers $g$, similar in character to those of the sweep F, the purpose of these fingers being to hold up the plants, vines, or canes of each row and prevent them from falling back so as to be covered up by the earth thrown up by the blade and to sift from them such earth as may have been thrown on them by the action of the blade, and also to throw up to the surface any weeds uprooted by the blades, and thus prevent said weeds from again becoming rooted, as they are likely to do if covered or partly covered by the earth. Fingers may be attached to the stem or standard of any of the blades for this purpose, if desired.

While a machine constructed in accordance with the drawings is capable of performing effective work, it should be understood that my invention is not limited to the special combination of parts shown and described, as some of these features may be used independently of others, as will be readily understood.

The machine, as shown, combines the functions of a vine-lifter, scratch-harrow, horse-hoe, and cultivator, and the toothed blades or plows render the machine available in many cases for use as a potato-digger.

I am aware that heavy single-beam plow-blades provided with rearwardly-projecting fingers are not new, and hence I do not broadly claim this feature; nor do I claim, broadly, a double-pointed harrow-tooth, as double-pointed teeth differing in construction from that devised by me have heretofore been used; but

I claim as my invention and desire to secure by Letters Patent—

1. The combination of the holder having a projecting boss or hub with lugs or projections on the under side, means for securing said holder at different angles on the frame, a hook, blade, or tooth having a stock with lugs or projections for engaging with those of the holder, and a bolt and nut serving to secure said stock to the holder and to permit pivotal movement of the same thereon, substantially as specified.

2. The within-described double-pointed scratch-tooth, the same consisting of a stock having opposite depending fingers and central pivot-bolt for adaptation to the holder, whereby circumferential adjustment of the stock on the holder will cause its teeth to laterally approach or recede from a longitudinal line drawn through the pivot, substantially as specified.

3. The combination of the frame of the machine, with a vine-lifting sweep, scratch or harrow teeth, side hoes, and rear central plow or scraper, substantially as specified.

In testimony whereof I have signed my name to this specification in the presence of two subscribing witnesses.

JOSEPH N. PARKER.

Witnesses:
H. F. REARDON,
HENRY HOWSON.